United States Patent [19]

Genik-Sas-Berezowsky et al.

[11] Patent Number: 4,632,701
[45] Date of Patent: Dec. 30, 1986

[54] PROCESS FOR THE RECOVERY OF SILVER FROM A RESIDUE ESSENTIALLY FREE OF ELEMENTAL SULPHUR

[75] Inventors: Roman M. Genik-Sas-Berezowsky, Edmonton; Donald R. Weir, Fort Saskatchewan, both of Canada

[73] Assignee: Sherritt Gordon Mines Limited, Toronto, Canada

[21] Appl. No.: 707,710

[22] Filed: Mar. 4, 1985

[30] Foreign Application Priority Data

Sep. 27, 1984 [CA] Canada ................................... 464180

[51] Int. Cl.$^4$ ............................................. C22B 11/04
[52] U.S. Cl. ................................. 75/118 R; 75/101 R; 75/105; 75/115; 75/108; 423/27; 423/29; 423/30; 423/31; 423/41; 423/45
[58] Field of Search ................. 423/27, 29, 30, 31, 423/47, 41, 45; 75/118 R, 101 R, 105, 115, 108

[56] References Cited

U.S. PATENT DOCUMENTS

| 4,053,305 | 10/1977 | Smyres et al. ................. 75/118 R |
| 4,070,182 | 1/1978 | Genik-Sas-Berezowsky et al. ................. 75/118 R |
| 4,259,107 | 3/1981 | Guay ................................. 423/29 |
| 4,405,569 | 9/1983 | Dienstbach ..................... 423/29 |
| 4,505,744 | 3/1985 | Weir et al. ..................... 423/150 |
| 4,571,263 | 2/1986 | Weir et al. ..................... 75/101 R |
| 4,571,264 | 2/1986 | Weir et al. ..................... 75/101 R |

*Primary Examiner*—John Doll
*Assistant Examiner*—Robert L. Stoll

[57] ABSTRACT

A process for the recovery of silver from a residue essentially free of elemental sulphur obtained by acidic pressure oxidation leaching or iron-containing sulphidic material which comprises forming a slurry of the residue with lime at a temperature of at least about 80° C. to raise the pH of the slurry to at least about 9. The slurry is maintained at this temperature for from about 0.5 to about 4 hours, and the resultant slurry is subjected to silver recovery treatment.

19 Claims, 2 Drawing Figures

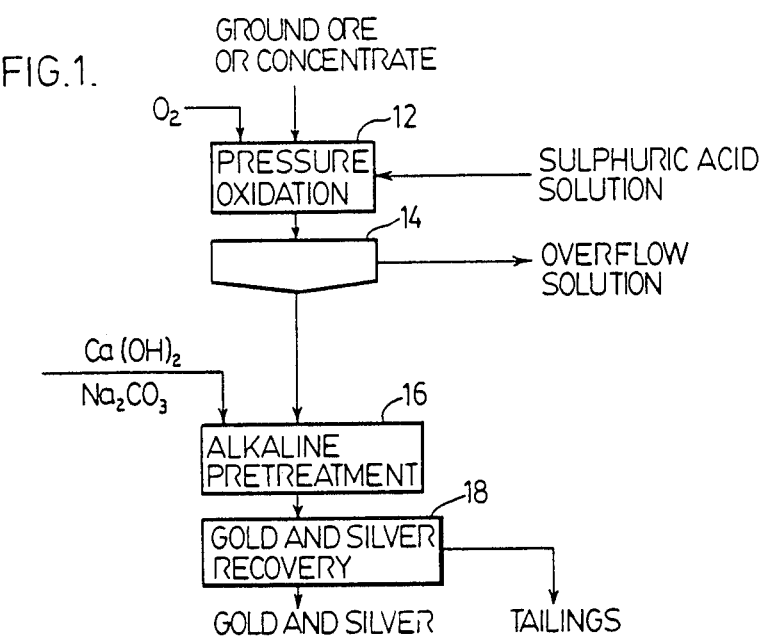
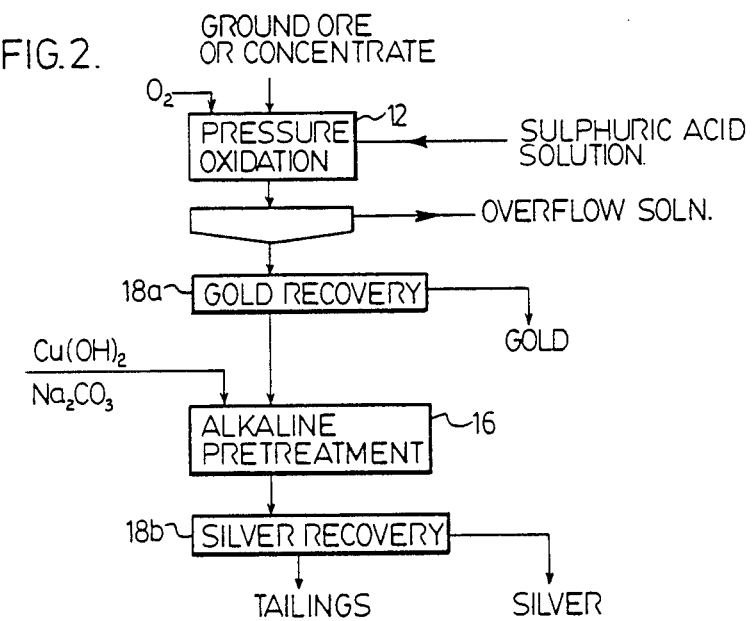

PROCESS FOR THE RECOVERY OF SILVER FROM A RESIDUE ESSENTIALLY FREE OF ELEMENTAL SULPHUR

This invention relates to the recovery of silver from residues essentially free of elemental sulphur obtained by acidic pressure oxidation leaching of iron-containing sulphidic material, for example refractory auriferous iron-containing sulphidic material.

It is known to leach iron-containing sulphidic materials, for example ores or concentrates, under pressurized oxidizing conditions in aqueous sulphuric acid solution in processes for the recovery of non-ferrous metal values in the material, for example copper, zinc, nickel, silver and gold. Copper, zinc and nickel values are dissolved in such leaching, and can be subsequently recovered from the resultant leach solution. Silver and gold remain in the leach residue and accordingly have to be recovered therefrom.

There are various ways of recovering gold and silver from an acidic pressure oxidation leach residue, for example by recovery treatment including cyanidation or ammonium thiosulphate leaching. It is known that, although satisfactory gold recovery can be obtained by directly treating acidic pressure oxidation leach residues in an appropriate gold recovery process, silver recovery is frequently very poor. It has been believed that the poor silver recovery was due to the presence of elemental sulphur in the residue formed during the acidic pressure oxidation leach, and accordingly attempts have been made to remove elemental sulphur from each residues before carrying out silver recovery treatment, for example as described in U.S. Pat. No. 4,063,933 (Peters) issued Dec. 20, 1977 in which the residue is subjected to a lime leach to remove elemental sulphur, with the resultant solids being separated from the solution before being subjected to silver and lead recovery steps. In other words, the teaching of the prior art has been to remove elemental sulphur from the acidic pressure oxidation leach residue before attempting silver recovery, with such sulphur removal usually involving treatment with lime and subsequent liquid-solids separation.

The present invention is based on the realization that it would be more desirable to carry out the pressure oxidation step in such a manner that the residue is essentially free of elemental sulphur, namely less than about 10% by weight of the sulphur in the material fed to the pressure oxidation step, and on the discovery that the most probable cause of poor silver recovery from pressure oxidation residues is the association of silver in a refractory iron compound formed by hydrolysis and subsequent precipitation of iron during the acidic pressure oxidation leach. Such a refractory iron compound may comprise hematite, basic ferric sulphate, ferric arsenate and various jarosites depending upon the nature of the starting material and the acidic pressure oxidation leach conditions.

According to one aspect of the invention, silver is released from the refractory iron compound in an essentially elemental sulphur-free residue, before the actual silver recovery treatment, by forming a slurry of the residue with lime at a temperature of at least about 80° C., advantageously above about 90° C., to raise the pH of the slurry to at least about 9, preferably to at least about 10, maintaining the slurry at said temperature for from about 0.5 to about 4 hours, and subjecting the resultant slurry to silver recovery treatment, preferably without prior liquid-solids separation.

According to another aspect of the invention, the essentially elemental sulphur-free residue is formed into a slurry at a temperature of at least about 80° C. with lime to raise the pH to at least about 9 and with an alkali carbonate to raise the pH to at least about 10.0, again with the resultant slurry being then subjected to silver recovery treatment, preferably without prior liquid-solids separation.

The invention is especially useful where the residue is silver and gold containing residue essentially free of sulphur obtained by acidic pressure oxidation of refractory auriferous iron-containing sulphidic material. The silver recovery treatment may comprise cyanidation treatment and gold may also be recovered, either before or after the silver recovery treatment.

Thus, in view of applicant's discovery of the true nature of the problem, the present invention involves lime treatment at elevated temperature of an acidic pressure oxidation residue which is essentially free of elemental sulphur. Also, a liquid-solids separation step between the alkaline treatment and the silver recovery treatment may not be necessary.

One embodiment of the invention will now be described, by way of example, with reference to the accompanying drawing in which FIGS. 1 and 2 show flow sheets of processes for the recovery of gold and silver from auriferous refractory iron-containing sulphidic ore or concentrate.

Referring first to FIG. 1, auriferous refractory iron-containing sulphidic ore or concentrate which is treated in this embodiment contains in the case of ore from about 3 to about 30 g/t gold, from about 15 to about 150 g/t silver, from about 1 to about 15% iron, from about 1 to about 10% sulphur by weight, and up to about 4% arsenic. In the case of concentrate, these may be from about 10 to about 240 g/t gold, from about 30 to about 300 g/t silver, from about 0.1 to about 25% arsenic, from about 10 to about 40% iron and from about 10 to about 45% sulphur.

After grinding to a suitable size, for example 70% minus 325 mesh Tyler screen (less than 45 microns), the ore or concentrate is subjected to an acidic pressure oxidation step 12 where the ore or concentrate is treated in aqueous sulphuric acid solution containing from about 5 to about 40 g/L sulphuric acid, at a temperature of from about 160° to about 200° C., a pulp density of from about 5 to about 50% solids, and a total pressure of from about 1000 to about 5000 kPa. The retention time may be from about 1 to about 3 hours. Under such conditions, sulphur values in the ore or concentrate are converted to sulphate form with essentially no elemental sulphur being present in the end residue. In other words, the residue would contain less than 10% and preferably less than 0.5% by weight of elemental sulphur compared to the sulphur in the ore or concentrate.

The slurry then proceeds to a thickener 14 from which the leach solution is treated as desired, for example for recovery of dissolved metal values therein, and at least partially recycled to the pressure oxidation step 12 to provide aqueous sulphuric acid solution therefor.

The solids slurry containing the gold and silver proceeds from thickener 14 to an alkaline treatment step 16 in accordance with the invention. Lime slurry is added to raise the pH to about 10, and then sodium carbonate is added to raise the pH to about 10.5, with the temperature being maintained at at least 80° C. The time taken for the alkaline treatment step 16 may be from about 1 to about 2 hours to ensure adequate digestion of the residue in the alkaline slurry.

After the alkaline treatment step 16, the resultant slurry is cooled and proceeds to an appropriate gold and silver recovery step 18, which may comprise recovery by cyanidation in known manner.

FIG. 2 shows an alternative flow sheet in which a gold recovery step 18a is carried out in any suitable manner such as by cyanidation before the alkaline pretreatment step 16, which is followed after cooling by silver recovery step 18b.

Various tests made in connection with the invention will now be described.

EXAMPLE 1

Refractory ore containing 6.3 g/t Au, 25.5 g/t Ag, 6.89% Fe and 4.77% sulphur was subjected to an acidic pressure oxidation step 12 as a 32% solids slurry at a temperature of 185° C., an oxygen partial pressure of 700 kPa, a starting acidity of 5 g/L $H_2SO_4$, and a retention time of 2 hours. The residue was filtered and washed, and was found to contain 5.87 g/t Au, 24.4 g/t Ag, and less than 0.1% elemental sulphur.

A series of cyanidation tests on residue samples was conducted in accordance with the teaching of the prior art at 25° C. for 24 hours over a pH range of 10–12, the pH adjustment being carried out at 25° C. with lime slurry, and with subsequent liquid-solids separation. A further test was carried out for 72 hours at pH 10.5. The results are shown in Table 1.

TABLE 1

| pH | Time (h) | Assays (g/t) Au | Assays (g/t) Ag | Extractions (%) Au | Extractions (%) Ag |
|---|---|---|---|---|---|
| 10 | 24 | 0.23 | 23.7 | 96.1 | 2.9 |
| 10.5 | 24 | 0.19 | 22.0 | 96.8 | 9.8 |
| 10.5 | 72 | 0.21 | 16.5 | 96.5 | 32.4 |
| 11.0 | 24 | 0.20 | 25.8 | 96.6 | 0 |
| 11.5 | 24 | 0.19 | 29.2 | 96.8 | 0 |
| 12.0 | 24 | 0.24 | 23.0 | 96.0 | 5.7 |

The results show that the gold extraction was substantially unaffected over the pH range, and that silver extractions were poor, although silver recovery was somewhat improved by extending the time to 72 hours.

EXAMPLE 2

Tests on residue samples were then carried out in accordance with the invention, i.e. treatment with lime, either alone or followed by treatment with sodium carbonate, at a temperature of at least about 80° C., and with subsequent cyanidation being carried out on the resultant slurry, i.e. with no prior liquid/solids separation. The results are shown in Table 2.

TABLE 2

| Alkaline Treatment Temp (°C.) | System | pH | Time (hr) | Cyanidation Residue Ag (g/t) | Cyanidation Residue % Extn Ag |
|---|---|---|---|---|---|
| 80 | Ca(OH)$_2$/Na$_2$CO$_3$ | 10.5 | 2 | <2 | >92 |
| 80 | Ca(OH)$_2$ | 11.0 | 2 | <2 | >92 |
| 95 | Ca(OH)$_2$ | 10.5 | 2 | <2 | >92 |
| 95 | Ca(OH)$_2$/Na$_2$CO$_3$ | 10.5 | 1 | <2 | >92 |

The advantages of the invention are therefore readily apparent from Table 2 with the silver recovery being increased to over 90%, far higher than the values shown in Table 2. It was found that gold extraction was also improved.

EXAMPLE 3

A refractory auriferous arsenopyrite concentrate, containing 63.5 g/t Au, 36.0 g/t Ag, 8.8% As, 24.1% Fe and 22.1% S, was reground to 94% minus 44 m. Conventional cyanidation of the reground concentrate extracted 32.0% Au and 30.3% Ag.

The concentrate was pressure oxidized in a continuous six compartment autoclave, at 190° C., 1650 kPa total pressure, and a nominal retention time of 2.5 h. Conventional cyanidation of samples of the oxidized concentrate produced during the run extracted in the range of 93.5 to 95.5% Au, and 0 to 12% Ag. Thus, although the pressure oxidation was effective in liberating refractory gold, the silver was rendered more refractory.

The slurry of oxidized concentrate discharged from the autoclave was subjected to two stages of washing in a CCD circuit, to remove dissolved arsenic, iron, sulphate and cyanicides liberated in the pressure oxidation. The second wash thickener underflow was subjected to pH adjustment and pretreatment in a continuous circuit comprising four stirred tanks in series. The slurry, containing 60% by weight solids, was adjusted to pH 10.8 with 180 kg CaO per tonne of oxidized solids, and diluted with water to 35% solids. The pretreatment was conducted in the second and third tanks at 90° to 95° C. The slurry was then cooled to 40° C. in the fourth tank, before proceeding to cyanidation. Retention time in the pretreatment tanks was 1.8 h each. The pretreated slurry was subjected to a single stage of leaching, in a stirred tank, at 40° C., with a retention time of 4.5 h. Gold and silver extractions at this point were 97.0 and 81.1% respectively. The leached slurry was then further processed through a carbon in leach section, comprising twelve stages, each with a 1 h retention, for additional leaching and gold and silver recovery by adsorption onto carbon. Extractions after three stages were 97.6% Au and 81.7% Ag. After the twelfth stage, the extractions were 97.8% Au and 82.7% Ag.

Other examples and embodiments of the invention will be readily apparent to a person skilled in the art, the scope of the invention being defined in the appended claims.

What we claim as new and desire to protect by Letters Patent of the United States is:

1. A process for the recovery of silver from a residue essentially free of elemental sulphur obtained by acidic pressure oxidation leaching of iron-containing sulphidic material, said residue containing less than about 10% by weight of elemental sulphur compared to the sulphur in the sulphidic material, comprising forming a slurry of the residue with lime at a temperature of at least about 80° C. to raise the pH of the slurry to at least about 9, maintaining the slurry at said temperature for from about 0.5 to about 4 hours, and subjecting the resultant slurry to silver recovery treatment.

2. A process according to claim 1 wherein the residue is silver and gold containing residue essentially free of elemental sulphur obtained by acidic pressure oxidation of refractory auriferous iron-containing sulphidic material.

3. A process according to claim 1 wherein the silver recovery treatment comprises cyanidation treatment.

4. A process for the recovery of silver from a residue essentially free of elemental sulphur obtained by acidic pressure oxidation leaching of iron-containing sulphidic material, said residue containing less than about 10% by weight of elemental sulphur compared to the sulphur in the sulphidic material, comprising forming a slurry of the residue at a temperature of at least about 80° C. with lime to raise the pH to at least about 9 and with an alkali carbonate to raise the pH to at least about 10, maintaining the slurry at said temperature for from about 0.5 to about 4 hours, and subjecting the resultant slurry to silver recovery treatment.

5. A process according to claim 4 wherein the residue is silver and gold containing residue essentially free of elemental sulphur obtained by acidic pressure oxidation of refractory auriferous iron-containing sulphidic material.

6. A process according to claim 4 wherein the alkali carbonate comprises sodium carbonate.

7. A process according to claim 4 wherein the silver recovery treatment comprises cyanidation treatment.

8. A process according to claim 1 wherein the resultant slurry is subjected to silver recovery treatment without liquid-solids separation.

9. A process according to claim 1 wherein the residue obtained from the iron-containing sulphidic material contains less than about 0.5% by weight of elemental sulphur compared to the sulphur in the material subjected to acidic pressure oxidation leaching.

10. A process according to claim 2 wherein the residue is subjected to a gold recovery step before said lime step.

11. A process according to claim 4 wherein the resulting slurry is subjected to silver recovery treatment without liquid-solids separation.

12. A process according to claim 4 wherein the essentially elemental sulphur-free residue contains less than about 0.5% by weight of elemental sulphur compared to the sulphur in the material subjected to acidic pressure oxidation leaching.

13. A process according to claim 5 wherein the residue is subjected to a gold recovery step before said lime step.

14. A process for the recovery of silver from iron-containing sulphidic material comprising subjecting the material to acidic pressure oxidation leaching to convert sulphur values in the material to sulphate form and produce an essentially sulphur-free residue containing less than about 10% by weight of elemental sulphur compared to the sulphur in the sulphidic material, forming a slurry of the residue with lime at a temperature of at least about 80° C. to raise the pH of the slurry to at least about 9, maintaining the slurry at said temperature for from about 0.5 to about 4 hours and subjecting the resultant slurry to silver recovery treatment.

15. A process according to claim 14 comprising forming a slurry of the residue at a temperature of at least about 80° C. with lime to raise the pH to at least about 9 and with an alkali carbonate to raise the pH to at least about 10.

16. A process according to claim 14 wherein the residue is silver and gold containing residue essentially free of elemental sulphur obtained by acidic pressure oxidation of refractory auriferous iron-containing sulphidic material.

17. A process according to claim 14 wherein the resultant slurry is subjected to silver recovery treatment without liquid-solids separation.

18. A process according to claim 16 wherein the residue is subjected to a gold recovery step before said lime step.

19. A process according to claim 14 wherein said essentially elemental sulphur-free residue contains less than about 0.5% by weight of elemental sulphur compared to the sulphur in the sulphidic material.

* * * * *